(12) United States Patent
Nago

(10) Patent No.: US 10,389,185 B2
(45) Date of Patent: Aug. 20, 2019

(54) COMMUNICATION APPARATUS, CONTROL METHOD, AND STORAGE MEDIUM

(71) Applicant: CANON KABUSHIKI KAISHA, Tokyo (JP)

(72) Inventor: Hidetada Nago, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 15/431,315

(22) Filed: Feb. 13, 2017

(65) Prior Publication Data

US 2017/0163102 A1 Jun. 8, 2017

Related U.S. Application Data

(63) Continuation of application No. 14/783,940, filed as application No. PCT/JP2014/056589 on Mar. 6, 2014, now Pat. No. 9,602,169.

(30) Foreign Application Priority Data

Apr. 17, 2013 (JP) .................................. 2013-086917

(51) Int. Cl.
*H01F 27/00* (2006.01)
*H01F 38/00* (2006.01)
(Continued)

(52) U.S. Cl.
CPC .............. *H02J 50/80* (2016.02); *H02J 5/005* (2013.01); *H04B 5/0031* (2013.01); *H04B 5/0037* (2013.01); *H04W 8/005* (2013.01); *H04W 12/06* (2013.01); *H04W 12/08* (2013.01); *H04W 76/14* (2018.02); *Y04S 40/24* (2013.01)

(58) Field of Classification Search
CPC ..... H04W 76/14; H04W 8/005; H04W 12/08; H04W 12/06; H04B 5/0037; H04B 5/0031; H02J 5/005; H02J 50/80; Y04S 40/24

See application file for complete search history.

(56) References Cited

U.S. PATENT DOCUMENTS 9,178,369 B2 * 11/2015 Partovi .................... H02J 7/025
9,461,501 B2 * 10/2016 Partovi ................. H02J 7/0027
(Continued)

FOREIGN PATENT DOCUMENTS

| CN | 101645618 A | 2/2010 |
|---|---|---|
| KR | 10-2012-0093358 A | 8/2012 |

*Primary Examiner* — Jared Fureman
*Assistant Examiner* — Esayas G Yeshaw
(74) *Attorney, Agent, or Firm* — Canon U.S.A., Inc. IP Division

(57) ABSTRACT

A communication apparatus includes first communication means having a first communication function for wirelessly communicating with a partner apparatus, and second communication means having an electric power supply function for wirelessly supplying electric power to the partner apparatus and a second communication function for wirelessly communicating with the partner apparatus. The second communication function is for transmitting specific data sequence to the partner apparatus in response to reception of specific data from the partner apparatus, and the electric power supply function is for supplying electric power to the partner apparatus in a case of receiving from the partner apparatus, with the first communication means, a signal indicating that the partner apparatus has received the data sequence.

19 Claims, 7 Drawing Sheets

(51) Int. Cl.
*H02J 50/80* (2016.01)
*H04W 76/14* (2018.01)
*H04B 5/00* (2006.01)
*H02J 5/00* (2016.01)
*H04W 8/00* (2009.01)
*H04W 12/06* (2009.01)
*H04W 12/08* (2009.01)

(56) References Cited

U.S. PATENT DOCUMENTS

| | | | | |
|---|---|---|---|---|
| 2002/0044468 A1* | 4/2002 | Goodarzi | ................ | H02M 1/10 363/98 |
| 2009/0001941 A1* | 1/2009 | Hsu | ...................... | H02J 7/0044 323/211 |
| 2011/0163608 A1* | 7/2011 | Brohlin | ................... | H02J 5/005 307/104 |
| 2012/0153739 A1* | 6/2012 | Cooper | ................... | H02J 5/005 307/104 |
| 2012/0212072 A1 | 8/2012 | Miyabayashi | | |
| 2012/0286582 A1* | 11/2012 | Kim | ........................ | H02J 5/005 307/104 |
| 2012/0306269 A1 | 12/2012 | Kim | | |
| 2013/0099591 A1* | 4/2013 | Yeo | ..................... | H02M 3/3376 307/104 |
| 2014/0004912 A1* | 1/2014 | Rajakarunanayake | ...................... | H04W 52/265 455/573 |
| 2014/0159654 A1* | 6/2014 | Lee | ........................ | H02J 7/025 320/108 |
| 2015/0021998 A1* | 1/2015 | Trescases | ................ | H02J 3/385 307/46 |
| 2015/0138846 A1* | 5/2015 | Yau | ................... | H02M 3/33507 363/21.04 |
| 2017/0326994 A1* | 11/2017 | Yuasa | ................... | B60L 11/182 |

* cited by examiner

COMMUNICATION APPARATUS, CONTROL METHOD, AND STORAGE MEDIUM

CROSS-REFERENCE TO RELATED APPLICATIONS

This application is a continuation of U.S. patent application Ser. No. 14/783,940, filed Oct. 12, 2015, which is a National Stage Entry of International Application No. PCT/JP2014/056589, filed Mar. 6, 2014, which claims the benefit of Japanese Patent Application No. 2013-086917, filed Apr. 17, 2013, all of which are hereby incorporated by reference herein in their entirety.

TECHNICAL FIELD

The present invention relates to a technique for identifying a partner apparatus in wireless power transfer.

BACKGROUND ART

With a wireless power transfer technique for wirelessly transferring electric power, a control signal is transmitted or received when electric power is supplied and received. Methods for transmitting or receiving the control signal includes an in-band method with which communication is performed using the same method as an electric power transfer method, and an out-of-band method with which communication is performed using a method that is different from the electric power transfer method. The in-band method, with which the communication rate is as low as 1 Mbps or lower, is frequently used since sufficient performance can be achieved if only the control signal for electric power transfer is transmitted.

On the other hand, in recent years, more and more apparatuses have a high-speed and large-capacity wireless communication function, such as a wireless LAN, in accordance with an increasing demand for a higher data communication rate. A control signal for electric power transfer is sufficiently smaller in size than data that is transmitted or received in general data communication, and if the control signal is transmitted with a high-speed and large-capacity communication system, the influence that the transmission of the control signal gives to transmission of other data is extremely small. For this reason, a method has also been studied for transmitting or receiving the control signal with the out-of-band method, rather than the in-band method, using the aforementioned high-speed and large-capacity communication system (see Japanese Patent Laid-Open No. 2012-075302).

When Bluetooth, a wireless LAN, or the like is used for out-of-band communication, the range of wireless power transfer does not coincide with the range in which communication can be performed, and accordingly there are cases where wireless power transfer cannot be performed even though the control signal can be transmitted or received. For example, in FIG. 8, a first electric power receiving apparatus 802 on an electric power supply apparatus 801 is within an electric power transfer range 804 and also within a control communication range 805. For this reason, the first electric power receiving apparatus 802 can receive electric power, and can also transmit or receive the control signal. On the other hand, a second electric power receiving apparatus 803 is out of the electric power transfer range 804, and is within the control communication range 805. For this reason, the second electric power receiving apparatus 803 can transmit or receive the control signal but cannot receive electric power.

In this situation, a problem arises in that the electric power supply apparatus cannot determine whether or not an apparatus near the electric power supply apparatus is the same as an apparatus transmitting or receiving the control signal. That is to say, in the example in FIG. 8, there can be the case where the electric power supply apparatus 801 is transmitting or receiving the control signal for supplying electric power to/from the first electric power receiving apparatus 802, but the electric power supply apparatus 801 does not supply electric power to the first electric power receiving apparatus 802 and incorrectly supplies electric power to the second electric power receiving apparatus 803.

The present invention has been made in view of the above-described problem, and provides a technique for identifying a partner apparatus to be the target of wireless power transfer.

SUMMARY OF INVENTION

According to one aspect of the present invention, there is provided a communication apparatus comprising: first communication means having a first communication function for wirelessly communicating with a partner apparatus; and second communication means having an electric power supply function for wirelessly supplying electric power to the partner apparatus and a second communication function for wirelessly communicating with the partner apparatus, wherein the second communication function is for transmitting a specific data sequence to the partner apparatus in response to reception of predetermined data from the partner apparatus, and the electric power supply function is for supplying electric power to the partner apparatus in a case of receiving from the partner apparatus, with the first communication means, a signal indicating that the partner apparatus has received the data sequence.

According to one aspect of the present invention, there is provided a communication apparatus comprising: first communication means having a first communication function for wirelessly communicating with a partner apparatus; and second communication means having an electric power receiving function for wirelessly receiving electric power from the partner apparatus and a second communication function for wirelessly communicating with the partner apparatus, wherein the second communication function is for transmitting predetermined data to the partner apparatus, and for receiving a specific data sequence that is transmitted from the partner apparatus in response to transmission of the predetermined data, the first communication function is for transmitting to the partner apparatus, in response to reception of the data sequence with the second communication function, a signal indicating reception of the data sequence, and the electric power receiving function is for receiving electric power that is supplied if the partner apparatus receives the signal.

According to another aspect of the present invention, there is provided a method for controlling a communication apparatus that includes first communication means having a first communication function for wirelessly communicating with a partner apparatus, and second communication means having an electric power supply function for wirelessly supplying electric power to the partner apparatus and a second communication function for wirelessly communicating with the partner apparatus, the method comprising: transmitting a specific data sequence to the partner apparatus in response to reception of predetermined data from the partner apparatus, by the second communication function, and supplying electric power to the partner apparatus in a case of receiving from the partner apparatus, with the first communication means, a signal indicating that the partner apparatus has received the data sequence, by the electric power supply function.

According to another aspect of the present invention, there is provided a method for controlling a communication apparatus that includes first communication means having a first communication function for wirelessly communicating with a partner apparatus, and second communication means having an electric power receiving function for wirelessly receiving electric power from the partner apparatus and a second communication function for wirelessly communicating with the partner apparatus, the method comprising: transmitting predetermined data to the partner apparatus, by the second communication function; receiving specific data sequence that is transmitted from the partner apparatus in response to transmission of the predetermined data, by the second communication function; transmitting to the partner apparatus, in response to reception of the data sequence with the second communication function, a signal indicating reception of the data sequence, by the first communication function; and receiving electric power that is supplied if the partner apparatus receives the signal, by the electric power receiving function.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention, and together with the description, serve to explain the principles of the invention.

DESCRIPTION OF EMBODIMENTS

Figure 8:
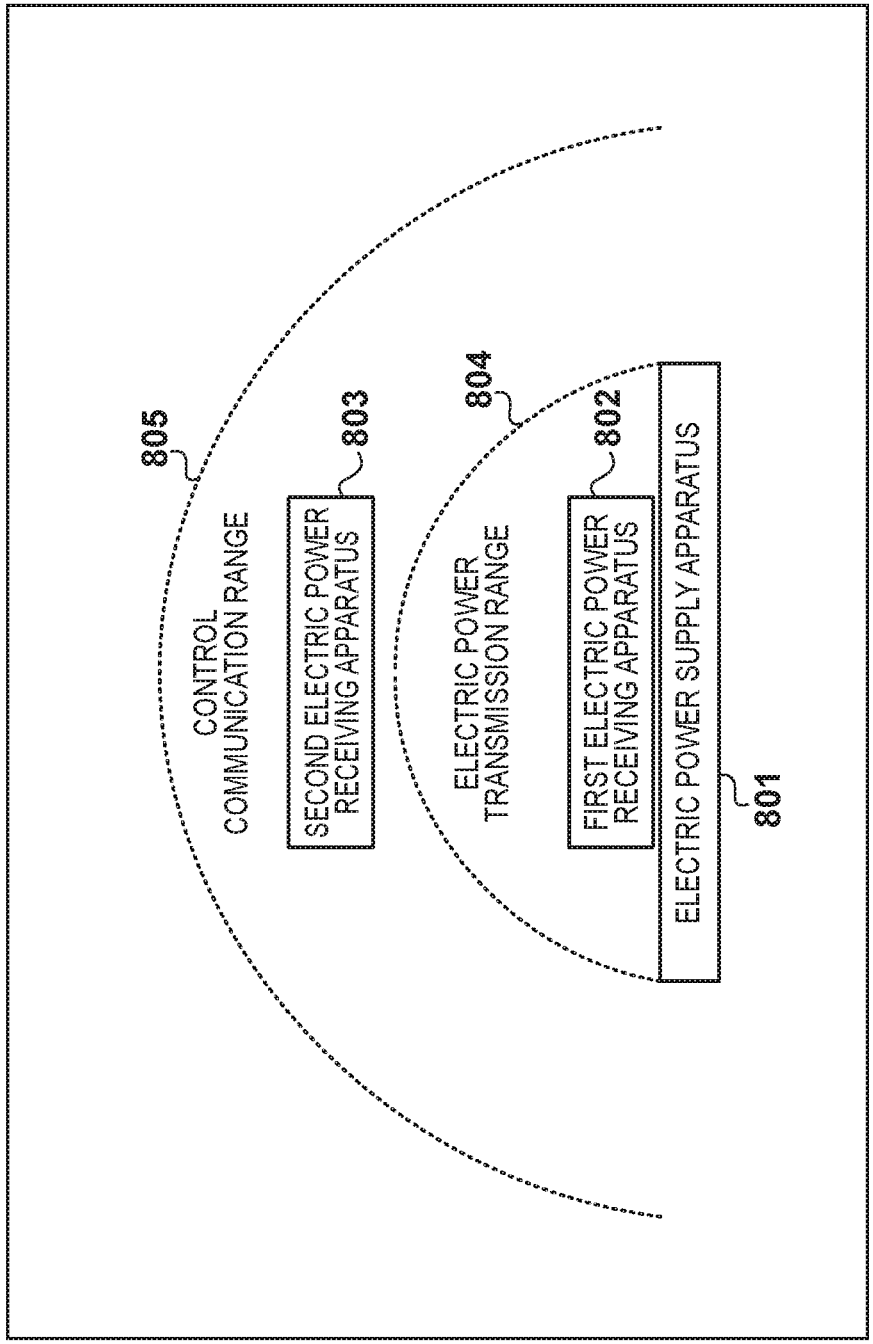
FIG. 8 is a diagram showing a communication system including the electric power supply apparatus and the electric power receiving apparatuses that have different electric power transfer range and communication range.

Hereinafter, an embodiment of the present invention will be described in detail with reference to the attached drawings. Note that a system described below includes an electric power supply apparatus and electric power receiving apparatuses as shown in FIG. 8, and a situation may possibly occur in this system where an electric power receiving apparatus can transmit or receive a control signal but cannot receive electric power by means of wireless power transfer, as shown with a second electric power receiving apparatus 803.

Configuration of Electric Power Supply Apparatus

Figure 1:
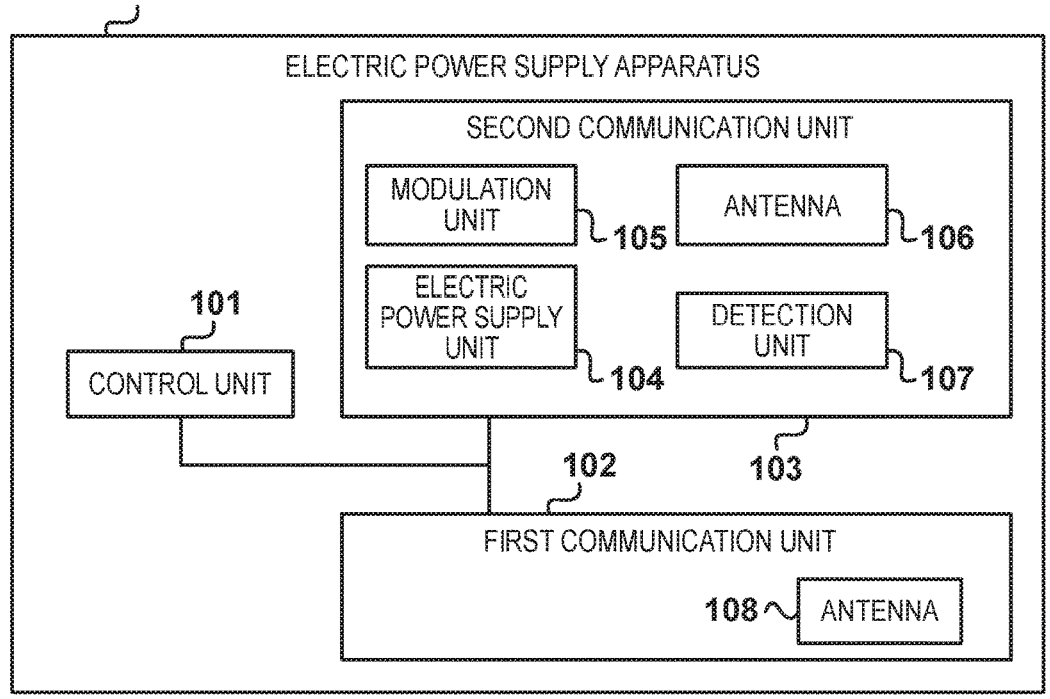
FIG. 1 is a block diagram showing an exemplary configuration of an electric power supply apparatus.

FIG. 1 shows an exemplary configuration of an electric power supply apparatus 801. The electric power supply apparatus 801 is a communication apparatus having a control unit 101, a first communication unit 102, and a second communication unit 103, for example. The control unit 101 has a function for controlling operations of the overall electric power supply apparatus 801, and causes the electric power supply apparatus 801 to execute the following operations by executing a program stored in a storage unit (not shown) with a CPU, for example.

The first communication unit 102 has a first communication function using Bluetooth (registered trademark), for example. Note that the first communication unit 102 has an antenna 108 for the first communication function. A signal from the first communication unit 102 is transmitted to a partner apparatus (electric power receiving apparatus) via the antenna 108, and a signal from the partner apparatus is input to the first communication unit 102 via the antenna 108. The first communication unit 102 performs communication for control. The first communication unit 102 communicates with an electric power receiving apparatus that is present within a control communication range 805 in FIG. 8, for example, in order to authenticate this apparatus.

The second communication unit 103 has an electric power supply function by means of wireless power transfer, and includes an electric power supply unit 104 for supplying electric power to a partner apparatus (electric power receiving apparatus). The electric power supply unit 104 has a function for outputting a detection signal in order to detect an electric power receiving apparatus that is put on the electric power supply apparatus 801 or that is near the electric power supply apparatus 801. The detection signal is transmitted via an antenna 106. At this time, a modulation unit 105 can transmit a specific data sequence to the partner apparatus by fluctuating the intensity of the detection signal. The detection unit 107 can also detect and thereby receive predetermined data that is superimposed by the partner apparatus on the detection signal that is output from the electric power supply unit 104. Note that if the intensity of the detection signal is not changed, the detection signal that is output by the electric power supply unit 104 is transmitted as-is via the antenna 106. The detection unit 107 may always monitor whether or not the partner apparatus has superimposed the predetermined data, or may start monitoring after a predetermined trigger is detected.

Note that the communication range and the electric power supply range of the second communication unit 103 are the range denoted by an electric power transfer range 804 in FIG. 8, for example. Note that in the example in FIG. 8, the communication range of the first communication unit 102 is longer than the communication range of the second communication unit 103, and the control communication range 805 is wider than the electric power transfer range 804. However, these ranges are not limited thereto, and may be any ranges.

Configuration of Electric Power Receiving Apparatus

Figure 2:
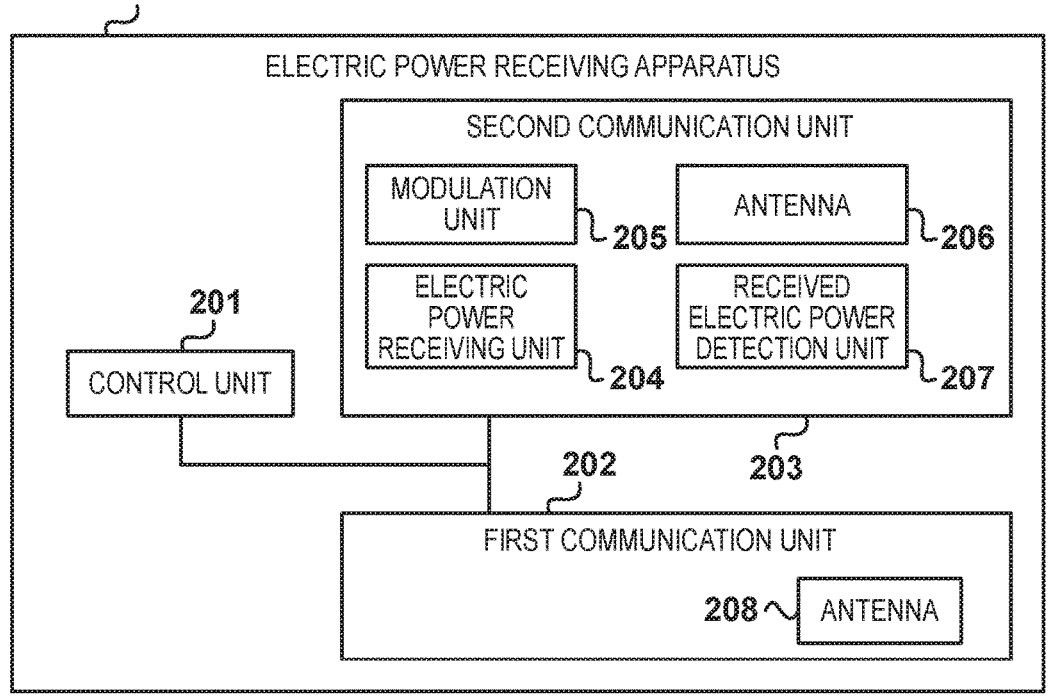
FIG. 2 is a block diagram showing an exemplary configuration of an electric power receiving apparatus.

FIG. 2 shows an exemplary configuration of an electric power receiving apparatus 802. Although the first electric power receiving apparatus 802 will be described below, the configuration and operations of the second electric power receiving apparatus 803 are similar to those of the first electric power receiving apparatus 802. The electric power receiving apparatus 802 is a communication apparatus having a control unit 201, a first communication unit 202, and a second communication unit 203, for example. The control unit 201 has a function for controlling operations of the overall electric power receiving apparatus 802, and causes the electric power receiving apparatus 802 to execute the following operations by executing a program stored in a storage unit (not shown) with a CPU, for example.

The first communication unit 202 corresponds to the first communication unit 102 in the electric power supply apparatus 801, and has a first communication function using Bluetooth, for example. A signal from the first communication unit 202 is transmitted to a partner apparatus (electric power supply apparatus) via an antenna 208, and a signal from the partner apparatus is input to the first communication unit 202 via the antenna 208.

The second communication unit 203 has an electric power receiving function by means of wireless power transfer, and includes an electric power receiving unit 204 for receiving electric power from a partner apparatus (electric power supply apparatus). The electric power receiving unit 204 receives electric power supplied from an electric power supply apparatus via an antenna 206 if the electric power receiving apparatus 802 is put on the electric power supply apparatus or the electric power receiving apparatus 802 is near the electric power supply apparatus. Note that if a detection signal is received that is transmitted by the electric power supply apparatus in order to detect a nearby electric power receiving apparatus, the modulation unit 205 can superimpose predetermined data on the detection signal. A received electric power detection unit 207 can obtain specific data sequence that is transmitted on the detection signal by the electric power supply apparatus, by catching and monitoring the change of electric power of the detection signal.

Here, the predetermined data to be superimposed by the electric power receiving apparatus 802 is a data sequence, such as a unique word, that is known by both the electric power supply apparatus and the electric power receiving apparatus. As a result of the electric power receiving apparatus superimposing this data sequence on the detection signal, the electric power supply apparatus can understand that the electric power receiving apparatus is present nearby. That is to say, even in the case where a foreign substance such as a metal piece is present nearby, the electric power supply apparatus will detect a change of impedance at the time of transmitting the detection signal, and accordingly cannot distinguish between the electric power receiving apparatus and the foreign substance if the electric power supply apparatus simply monitors only impedance change. On the other hand, if a unique word is superimposed on the detection signal, the electric power supply apparatus determines that the electric power receiving apparatus is present nearby in the case of detecting this unique word. If there is an impedance change but the unique word is not detected, the electric power supply apparatus can determine that a foreign substance is approaching. Accordingly, the electric power supply apparatus can correctly identify the presence of the nearby electric power receiving apparatus by using the unique word.

The specific data sequence that the electric power supply apparatus 801 transmits on the detection signal is a random bit sequence, for example. Only if the electric power supply apparatus 801 detects the predetermined data from the electric power receiving apparatus 802, information that only the electric power supply apparatus 801 and the electric power receiving apparatus 802 are to know can be exchanged by notifying the electric power receiving apparatus 802 of such a data sequence. Then, the first communication unit 202 in the electric power receiving apparatus 802 transmits a signal indicating that the data sequence has been received, and the first communication unit 102 in the electric power supply apparatus 801 receives this signal. Thus, the electric power supply apparatus 801 can identify that the electric power receiving apparatus 802 that is present on the electric power supply apparatus 801 or near the electric power supply apparatus 801 is identical to the partner apparatus communicating with the electric power supply apparatus 801 via the first communication unit 102. That is to say, for example, in the state shown in FIG. 8, the second electric power receiving apparatus 803 cannot obtain the specific data sequence from the electric power supply apparatus 801, and therefore cannot transmit the data sequence via the first communication unit 202. Accordingly, even if the electric power supply apparatus 801 is performing authentication for electric power transfer with the second electric power receiving apparatus 803 via the first communication unit 102, the electric power supply apparatus 801 can identify that the apparatus on the electric power supply apparatus 801 is not the second electric power receiving apparatus 803. Similarly, the first electric power receiving apparatus 802 can receive the specific data sequence, but if the first electric power receiving apparatus 802 is not performing communication for control via the first communication unit 202, the first electric power receiving apparatus 802 will not transmit this data sequence to the electric power supply apparatus 801. Accordingly, the electric power supply apparatus 801 can be prevented from incorrectly supplying electric power to an electric power receiving apparatus that the electric power supply apparatus 801 is not communicating with for control.

Figure 3:
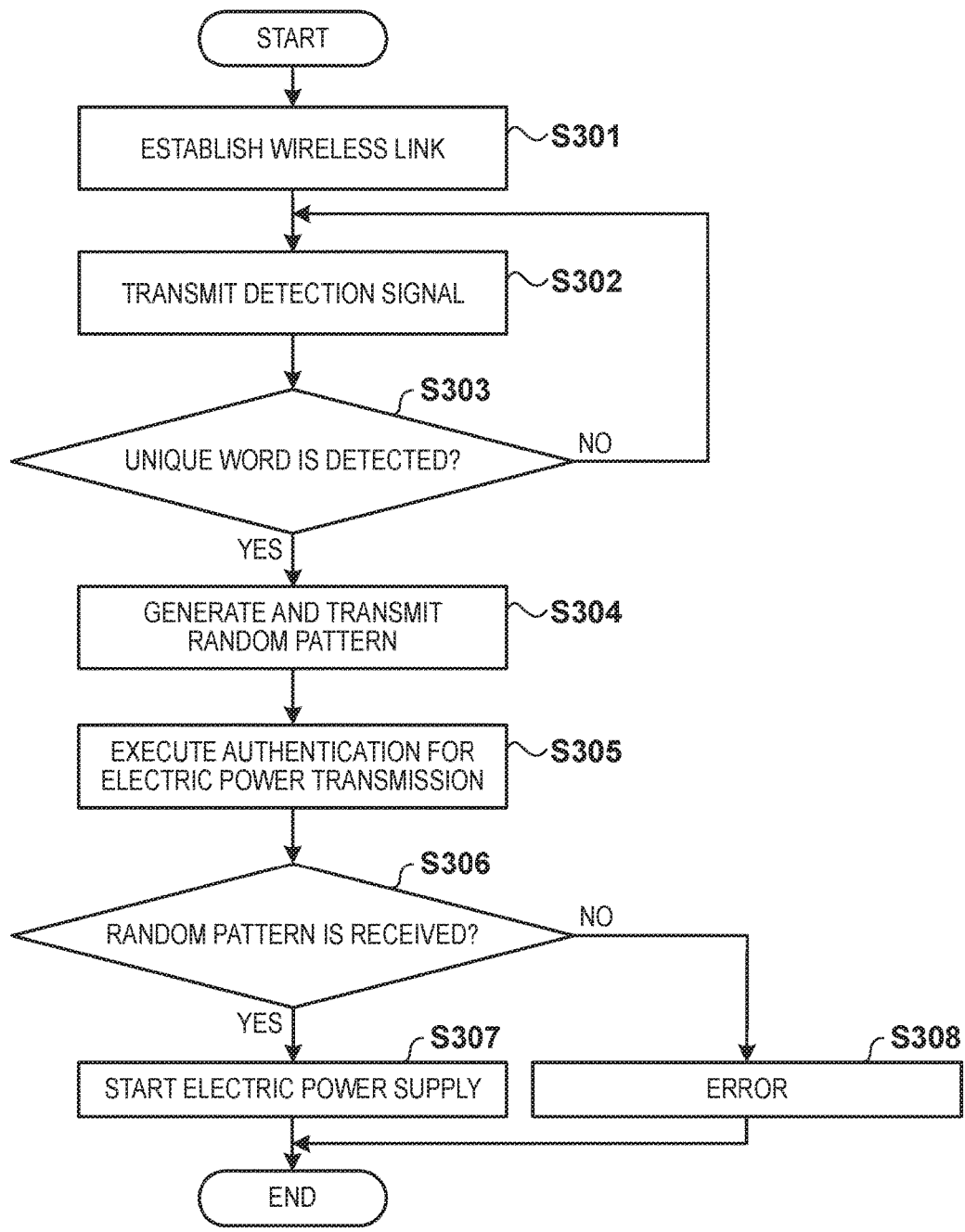
FIG. 3 is a flowchart showing exemplary operations of the electric power supply apparatus.
Figure 4:
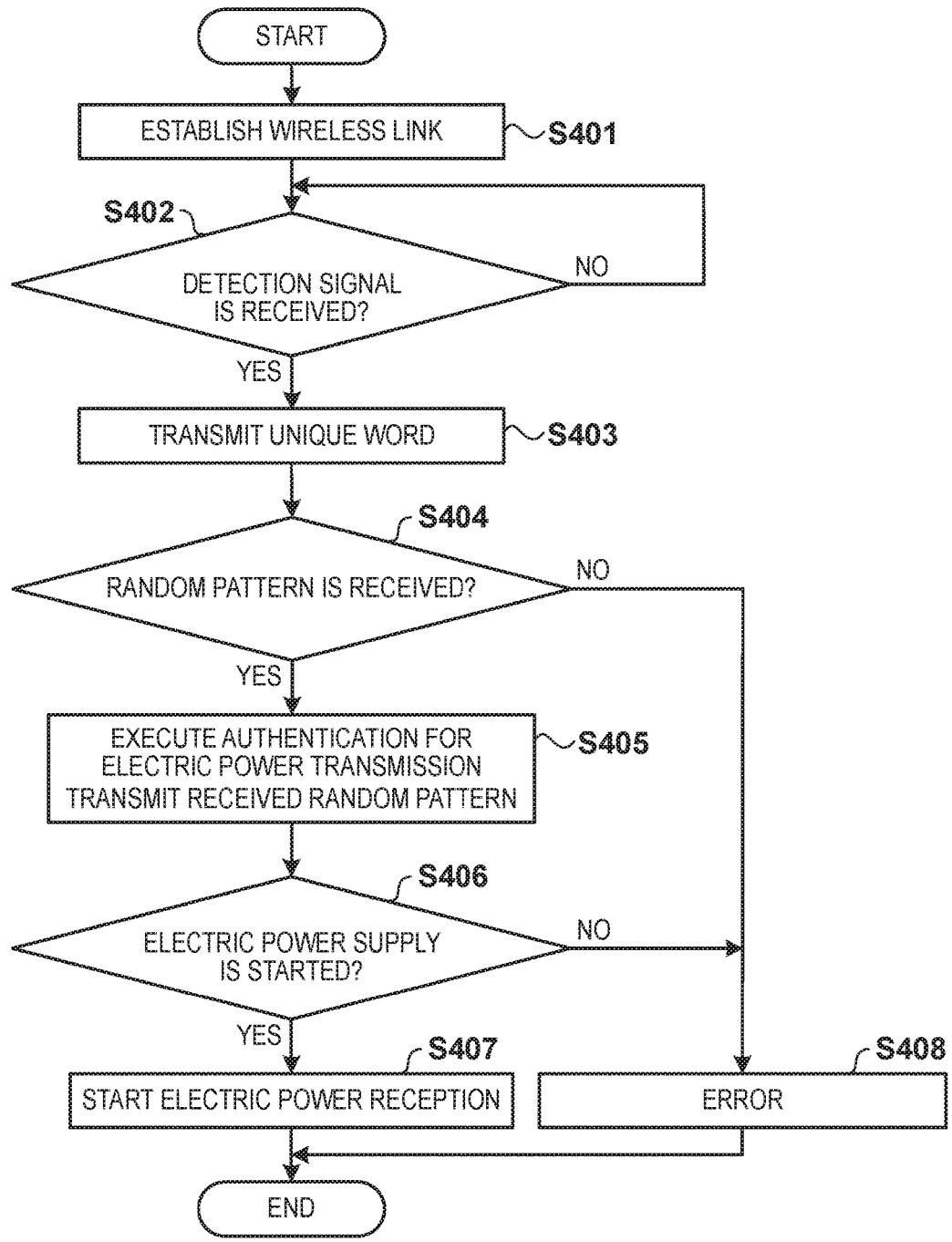
FIG. 4 is a flowchart showing exemplary operations of the electric power receiving apparatus.
Figure 5:
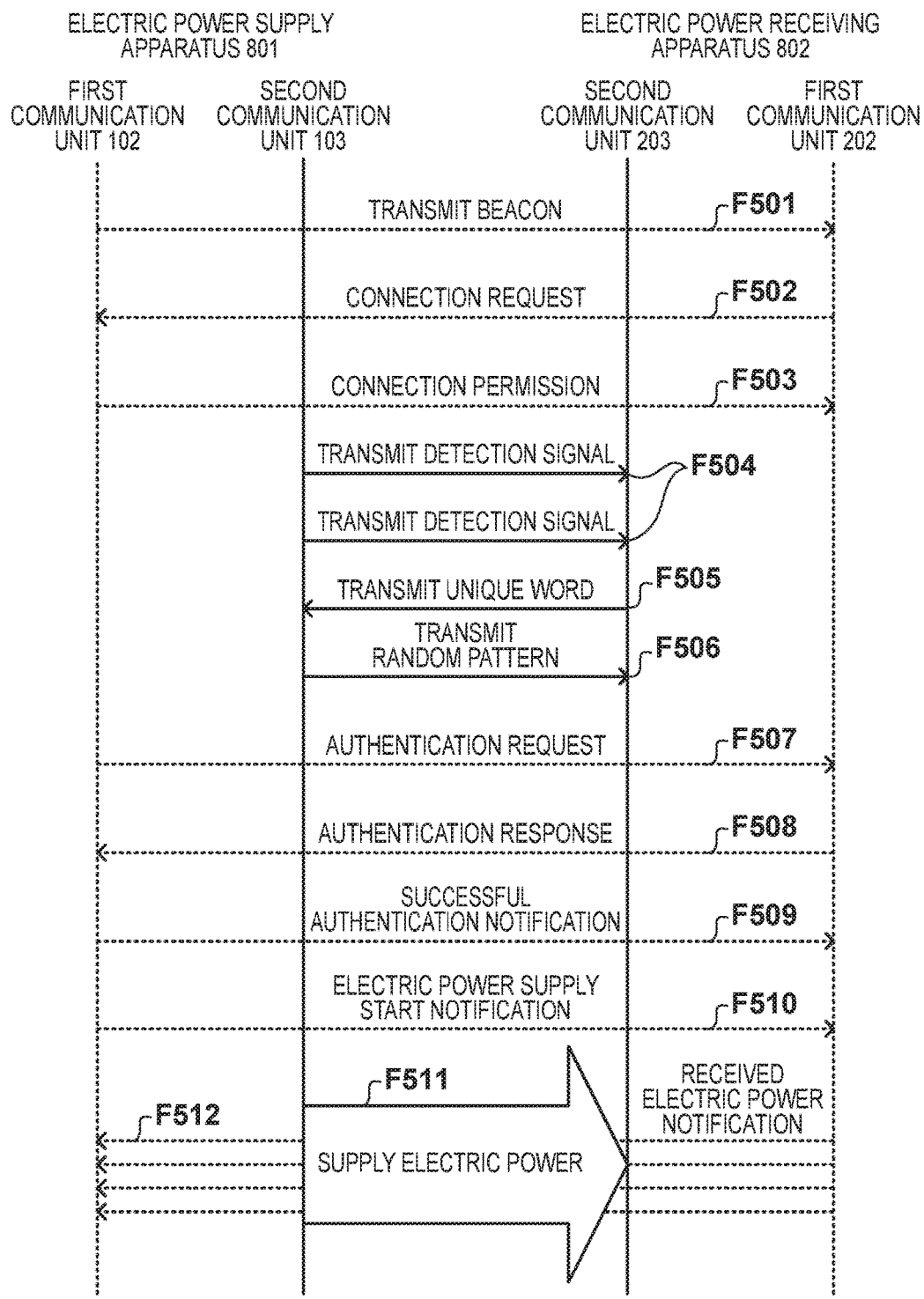
FIG. 5 is a sequence chart showing the flow of signals between the electric power supply apparatus and the electric power receiving apparatus.

Operations of Electric Power Supply Apparatus and Electric Power Receiving Apparatus Subsequently, operations of the electric power supply apparatus and the electric power receiving apparatus will be described. FIGS. 3 and 4 are flowcharts showing the flows of operations of the electric power supply apparatus and the electric power receiving apparatus, respectively. FIG. 5 is a sequence chart showing the flow of signals transmitted or received between the electric power supply apparatus and the electric power receiving apparatus.

Note that in the following description, the first communication functions of the electric power supply apparatus and the electric power receiving apparatus are Bluetooth communication functions, and the control signal is transmitted or received using Bluetooth. To perform Bluetooth communication, in general, pairing needs to be performed in advance. In the case of not performing pairing, it is necessary to configure a setting such that a specific PIN number can be used at the time of authentication. In the following description, it is assumed that pairing has been executed in advance between the electric power supply apparatus 801 and the electric power receiving apparatus 802, between which electric power is transferred. In the description, the electric power supply apparatus 801 and the electric power receiving apparatus 802 are a Bluetooth host and a Bluetooth device, respectively.

Initially, a wireless link is established between the electric power supply apparatus 801 and the electric power receiving apparatus 802 (S301, S401). Specifically, initially, the electric power supply apparatus 801 periodically outputs a beacon with the first communication unit 102 (F501). The first communication unit 202 in the electric power receiving apparatus 802, when in the control communication range 805 of the electric power supply apparatus 801, can receive the beacon that is output by the electric power supply apparatus 801. The control unit 201 in the electric power receiving apparatus 802, upon detecting the electric power supply apparatus 801 that has been paired from information contained in the received beacon, controls the first communication unit 202 so as to transmit a wireless connection request to this electric power supply apparatus 801 (F502). In the electric power supply apparatus 801, upon the first communication unit 102 receiving the wireless connection request from the electric power receiving apparatus 802, the control unit 101 determines whether or not the electric power receiving apparatus 802 has been paired, and permits wireless connection using the first communication unit 102 if the electric power receiving apparatus 802 is a paired partner (F503). In this manner, a wireless link is established between the electric power supply apparatus 801 and the electric power receiving apparatus 802 (S301, S401).

After the wireless communication is established, in the electric power supply apparatus 801, the control unit 101 controls the electric power supply unit 104 so as to output the detection signal for detecting whether or not the electric power receiving apparatus 802 is present within the electric power transfer range 804 of the electric power supply apparatus 801, e.g., on the electric power supply apparatus 801 (S302, F504). The output of this detection signal is smaller than that of a signal for electric power transfer that is used for wireless power transfer, and may have a pulse shape, for example.

Upon the electric power receiving apparatus 802 being put within the electric power transfer range 804 of the electric power supply apparatus 801, the received electric power detection unit 207 in the electric power receiving apparatus 802 detects the detection signal that is output by the electric power supply apparatus 801 (S402). In the electric power receiving apparatus 802, if the detection signal is detected (YES in S402), the modulation unit 205 superimposes a specific unique word on the detection signal (F505, S403). That is to say, the electric power receiving apparatus 802 transmits the unique word to the electric power supply apparatus 801.

Upon the specific unique word being superimposed on the detection signal, the detection unit 107 in the electric power supply apparatus 801 detects the unique word, and detects that the electric power receiving apparatus 802 is present in the electric power transfer range of the electric power supply apparatus 801 (YES in S303). Here, the detection unit 107 may determine that it has detected the unique word if, for example, a correlation value between a waveform indicating the change of the intensity of the detection signal and a waveform of the unique word that the electric power supply apparatus 801 knows is higher than a predetermined value. Here, if the detection signal is transmitted when a foreign substance such as metal is put on the electric power supply apparatus 801, the detection unit 107 can detect a certain impedance change. However, since the unique word is not superimposed in this case, the detection unit 107 can easily discriminate that not the electric power receiving apparatus 802 but a foreign substance has been put.

In the electric power supply apparatus 801, upon the unique word being detected (YES in S303), the control unit 101 or the modulation unit 105 generates an 8-bit random pattern, for example, and the modulation unit 105 fluctuates the output intensity of the detection signal in accordance with the random pattern (S304). Then, in the electric power receiving apparatus 802, as a result of the received electric power detection unit 207 detecting the fluctuation of the intensity of the detection signal (S404), the electric power supply apparatus 801 can notify the electric power receiving apparatus 802 of the random pattern via the second communication unit (F506). Here, the received electric power detection unit 207 may discriminate a bit sequence of the random pattern by setting a predetermined time as one bit unit and providing a threshold value for discriminating between 1 and 0, for example. Note that the discriminated bit sequence is transferred to the control unit 201, and the control unit 201 holds the bit sequence, for example.

Note that the random pattern may be a sequence other than a binary sequence, and may be longer or shorter than 8 bits. Alternatively, rather than generating a random pattern, any of a plurality of data sequence patterns that have been prepared in advance may be selected and used. The random pattern may be transmitted only once, or may be transmitted multiple times. As a result of the random pattern being transmitted multiple times, for example, the electric power receiving apparatus 802 can correctly identify the random pattern.

Figure 6:
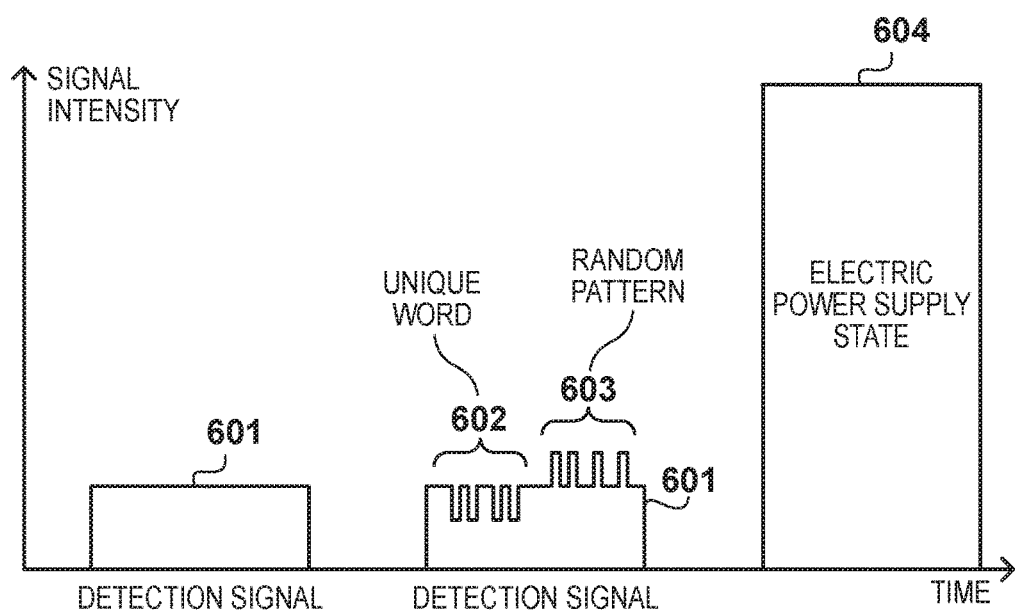
FIG. 6 is a conceptual diagram of a detection signal transmitted by the electric power supply apparatus.

Here, an exemplary intensity change of the signal that is output from the electric power supply apparatus 801 will be described using FIG. 6. Initially, upon the wireless link being established by the first communication unit 102, the electric power supply apparatus 801 outputs a detection signal 601. It is assumed that the electric power receiving apparatus 802 or a foreign substance is not present in the electric power transfer range 804 of the electric power supply apparatus 801 at this time. Since the electric power receiving apparatus 802 is not detected, the electric power supply apparatus 801 outputs the detection signal 601 again. Here, if the electric power receiving apparatus 802 is within the electric power transfer range 804 of the electric power supply apparatus 801, the modulation unit 105 in the electric power receiving apparatus 802 superimposes the unique word on the detection signal 601 by means of load modulation or the like, and the waveform of the detection signal changes accordingly (602). Then, in the electric power supply apparatus 801, upon the detection unit 107 detecting the change (602) of this waveform, the modulation unit 105 fluctuates the output intensity of the detection signal and outputs the random pattern (603). The received electric power detection unit 207 in the electric power receiving apparatus 802 can obtain the random pattern by detecting the fluctuation of the intensity. Note that upon electric power transfer being started, an electric power supply signal 604, whose electric power is larger than that of the detection signal, is output.

After transmitting the random pattern, the electric power supply apparatus 801 transmits an authorization request for electric power transfer to the electric power receiving apparatus 802 that is wirelessly connected using the first communication unit 102 (S305, F507). In the electric power receiving apparatus 802, the first communication unit 202, upon receiving the authorization request for electric power transfer, transmits an authorization response to the electric power supply apparatus 801 (S405, F508). Here, the authorization response signal contains at least information of electric power requested by the electric power receiving apparatus 802, and information indicating that the random pattern for the detection signal has been received. Note that the information indicating that the random pattern has been received may be the random pattern itself. That is to say, if an 8-bit random pattern is received, all of these 8 bits may be contained in the authorization response. Alternatively, the information indicating that the random pattern has been received may be part of the random pattern, for example. For example, a transmission target (e.g., from xth bit to yth bit)

may be defined from the transmission time of the authentication response, an identifier of at least one of the first communication units 102 and 202, or the like, and the data corresponding to the transmission target in the random pattern may be contained in the authentication response.

If the control unit 101 in the electric power supply apparatus 801 confirms that the information indicating that the electric power receiving apparatus 802 has received the random pattern is contained in the authentication response (YES in S306), the control unit 101 transmits a successful authentication notification to the electric power receiving apparatus 802 (F509). Here, this confirmation is performed by, for example, matching the random pattern generated by the control unit 101 or the modulation unit 105 with the random pattern contained in the authentication response, and confirming that these random patterns coincide with each other. After authentication for electric power transfer is successful, the electric power supply apparatus 801 notifies the electric power receiving apparatus 802 of start of electric power supply (F510). With the electric power supply start notification, the electric power receiving apparatus 802 can understand that electric power supply starts (YES in S406). After giving the electric power supply start notification, the electric power supply apparatus 801 starts to supply the electric power requested by the electric power receiving apparatus 802 that was obtained at the time of authentication (F511, S307, S407). Note that while electric power is supplied (F511), the electric power receiving apparatus 802 periodically notifies the electric power supply apparatus 801 of the received electric power (F512).

On the other hand, if the information indicating that the electric power receiving apparatus 802 has received the random pattern is not contained in the authentication response (NO in S306), or if authentication has failed due to other factors, electric power is not supplied. Here, there are two possible reasons why the random pattern generated by the electric power supply apparatus 801 is different from the random pattern received from the electric power receiving apparatus 802.

The first reason is the case where all bits of the random pattern received from the electric power receiving apparatus 802 are 0. This is caused when the electric power receiving apparatus 802 is not within the electric power transfer range 804 of the electric power supply apparatus 801, and the electric power receiving apparatus that has transmitted or received the unique word and the random pattern is different from this electric power receiving apparatus 802. That is to say, for example, if authentication of the second electric power receiving apparatus 803 is performed between the first communication units in FIG. 8, the second electric power receiving apparatus 803 does not know the random pattern. However, the electric power supply apparatus 801 can communicate with the first electric power receiving apparatus 802 by means of the second communication unit, and accordingly generates and transmits the random pattern. For this reason, the random pattern received from the second electric power receiving apparatus 803 will not coincide with the random pattern generated by the electric power supply apparatus 801. In this case, the electric power supply apparatus 801 displays an error message indicating that an apparatus that is not yet connected wirelessly is put thereon, for example (S308).

The second reason is the case where the electric power receiving apparatus 802 is present in the electric power transfer range of another electric power supply apparatus. At this time, the random pattern transmitted by the electric power receiving apparatus 802 is obtained from the other electric power supply apparatus, and accordingly will not coincide with the random pattern generated by the electric power supply apparatus 801. In this case, the electric power supply apparatus 801 notifies the electric power receiving apparatus 802 that authentication for electric power transfer has failed since the random patterns does not coincide (S308). The electric power receiving apparatus 802, upon receiving this notification, displays an error message and prompts the user to move the electric power receiving apparatus 802 toward the correct electric power supply apparatus 801 (S408).

Figure 7:
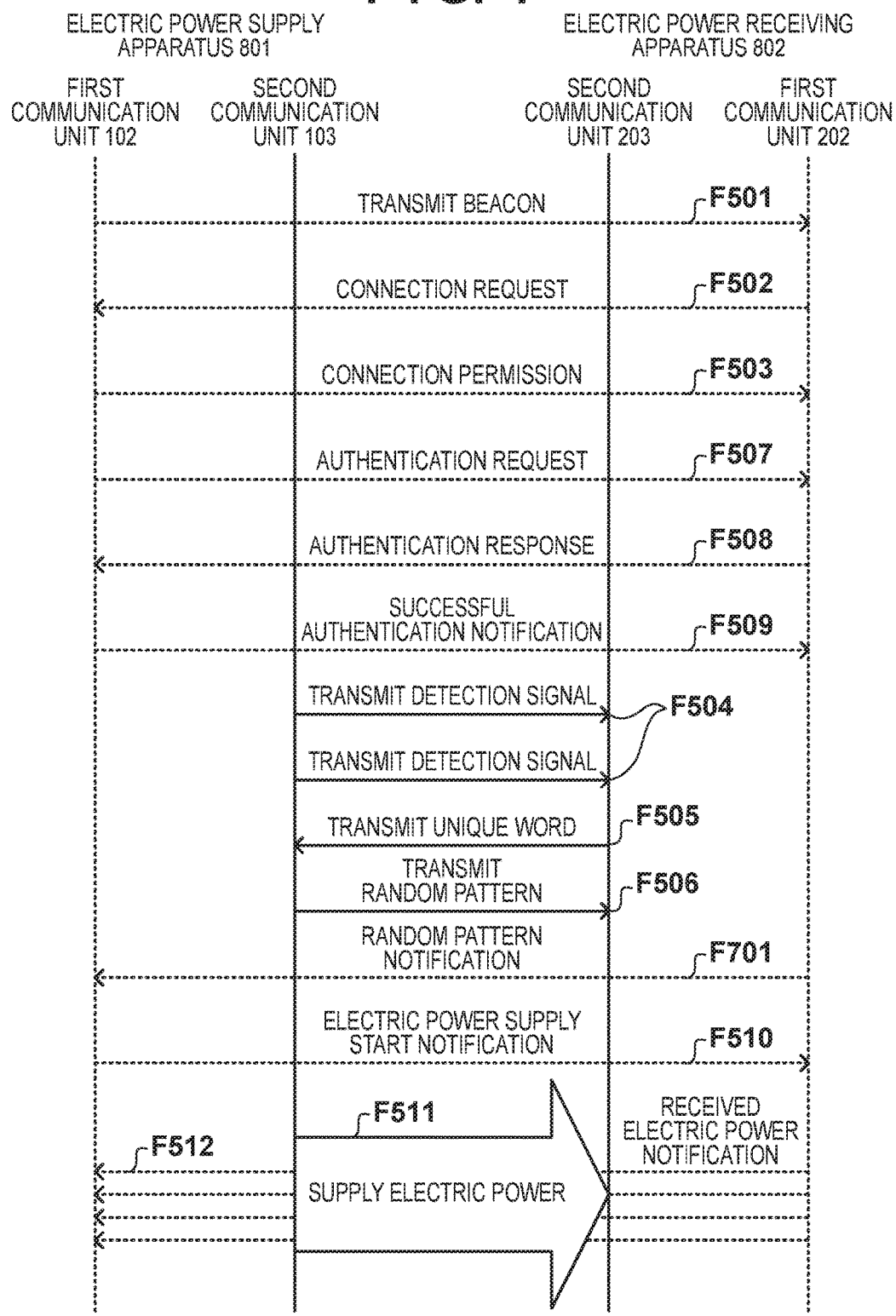
FIG. 7 is a sequence chart showing the flow of signals between the electric power supply apparatus and the electric power receiving apparatus.

Note that although the random pattern is contained in the authentication response for electric power transfer in the above description, this need not be the case. For example, in the case where authentication for electric power transfer is executed first and thereafter the notification of the random pattern is given, the electric power receiving apparatus 802 may transmit the random pattern to the electric power supply apparatus 801 via the first communication unit 202 after receiving this notification. The exemplary operations in this case are shown in FIG. 7. In FIG. 7, the link is established (F501 to F503), and thereafter authentication is performed (F507 to F509) prior to transmission or reception (F504) of a detection signal. In this case, since the notification of the random pattern has not been given at the time of authentication, the random pattern is not contained in the authentication response, and general authentication, such as conventionally-performed one, is performed as this authentication. After the authentication ends, the detection signal is output (F504), the unique word is transmitted (F505), and the random pattern is transmitted (F506). Since the electric power receiving apparatus 802 can obtain the random pattern at this point in time, the electric power receiving apparatus 802 thereafter notifies the electric power supply apparatus 801 of the information indicating that the electric power receiving apparatus 802 has received the random pattern (F701). The electric power supply apparatus 801 transmits an electric power supply start notification (F510) if the random pattern that the electric power supply apparatus 801 is notified of coincides with the random pattern generated by the electric power supply apparatus 801, for example. Here, if two random patterns do not coincide, the aforementioned error processing is performed.

As described above, the method for identifying the electric power receiving apparatus according to the present embodiment does not depend on the processing order, and the information that the electric power receiving apparatus can obtain only within the electric power transfer range is transmitted to the electric power supply apparatus with an interface for performing communication for control. Thus, with the electric power supply apparatus whose electric power transfer range may possibly be different from the control communication range thereof, the electric power receiving apparatus to be an electric power supply target can be correctly identified. Moreover, since the electric power receiving apparatus can be correctly identified by the electric power supply apparatus that performs authentication, the electric power receiving apparatus can receive supply of appropriate electric power as a result of the authentication.

According to the present invention, a partner apparatus to be the target of wireless power transfer can be identified.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment of the present invention, and by a method performed by the computer of the system or apparatus by, for example, reading out and executing the computer executable instructions from the storage medium to perform the functions of one or more of the above-described embodiment. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
a power transmission unit configured to wirelessly transmit power to another communication apparatus;
a communication unit configured to communicate with said another communication apparatus to perform authentication for wireless power transfer; and
a control unit configured to control the power transmission unit,
wherein, in a case where the authentication via the communication unit succeeds, the control unit controls the power transmission unit so that the power transmission unit wirelessly transmits power based on power requested by said another communication apparatus, and in a case where the authentication via the communication unit does not succeed, the control unit controls the power transmission unit so that the power transmission unit limits the wireless power transfer.

2. The communication apparatus according to claim 1, wherein the communication apparatus receives, from said another communication apparatus, information related to power requested by said another communication apparatus.

3. The communication apparatus according to claim 1, wherein the communication unit receives, from said another communication apparatus, information related to power requested by said another communication apparatus.

4. The communication apparatus according to claim 1, wherein the power transmission unit wirelessly transmits power to said another communication apparatus using a first antenna, and
the communication unit communicates with said another communication apparatus to perform authentication for wireless power transfer using a second antenna that is different from the first antenna.

5. The communication apparatus according to claim 4, further comprising another communication unit configured to communicate with said another communication apparatus using the first antenna.

6. The communication apparatus according to claim 5, wherein the control unit determines whether or not another communication apparatus that has been authenticated via the communication unit is identical to another communication apparatus with which communication has been performed by said another communication unit.

7. The communication apparatus according to claim 1, wherein in a case where the authentication via the communication unit does not success, the power transmission unit does not perform wireless power transfer.

8. A communication apparatus comprising:
a power reception unit configured to wirelessly receive power from another communication apparatus;
a communication unit configured to communicate with said another communication apparatus to perform authentication for wireless power transfer; and
a control unit configured to control the power reception unit,
wherein, in a case where the authentication for wireless power transfer via the communication unit succeeds, the control unit controls the power reception unit so that the power reception unit wirelessly receives power based on power requested by the communication apparatus, from said another communication apparatus, and in a case where the authentication via the communication unit does not succeed, the control unit controls the power reception unit so that the power reception unit limits the wireless power reception.

9. The communication apparatus according to claim 8, wherein the communication apparatus transmits, to said another communication apparatus, information related to power that the communication apparatus requests.

10. The communication apparatus according to claim 8, wherein the communication unit transmits, to said another communication apparatus, information related to power that the communication apparatus requests.

11. The communication apparatus according to claim 8, wherein the communication apparatus receives, from said another communication apparatus, a signal indicating that the authentication has succeeded.

12. The communication apparatus according to claim 8, wherein the power reception unit wirelessly receives power from said another communication apparatus using a first antenna, and
the communication unit communicates with said another communication apparatus to perform authentication for wireless power transfer using a second antenna that is different from the first antenna.

13. The communication apparatus according to claim 12, further comprising another communication unit configured to communicate with said another communication apparatus using the first antenna.

14. A power transmission method of a communication apparatus that wirelessly transmits power to another communication apparatus, the method comprising:
performing communication with said another communication apparatus to perform authentication for wireless power transfer;
in a case where the authentication via the communication succeeds, controlling the communication apparatus so that the communication apparatus wirelessly transmits power based on power requested by said another communication apparatus, and
in a case where the authentication via the communication does not succeed, controlling the communication apparatus so that the communication apparatus limits the wireless power transfer.

15. The power transmission method according to claim 14, further comprising receiving, from said another communication apparatus, information related to power requested by said another communication apparatus.

16. The power transmission method according to claim 14, wherein, in the controlling, the communication apparatus wirelessly transmits power to said another communication apparatus using a first antenna, and in performing communication, the communication apparatus communicates with said another communication apparatus to perform authentication for wireless power transfer using a second antenna that is different from the first antenna.

17. A power reception method of a communication apparatus that wirelessly receives power from another communication apparatus, the method comprising:

performing communication with said another communication apparatus to perform authentication for wireless power transfer; and in a case where the authentication for wireless power transfer via the communication succeeds, controlling the communication apparatus so that the communication apparatus wirelessly receives power based on power requested by the communication apparatus, from said another communication apparatus, and in a case where the authentication via the communication does not succeed, controlling the communication apparatus so that the communication apparatus limits the wireless power reception.

18. A non-transitory computer-readable storage medium that stores a computer program for causing a computer included in a communication apparatus, which wirelessly transmits power to another communication apparatus, to:

perform communication with said another communication apparatus to perform authentication for wireless power transfer;

in a case where the authentication via the communication succeeds, control the communication apparatus so that the communication apparatus wirelessly transmits power based on power requested by said another communication apparatus, and in a case where the authentication via the communication does not succeed, control the communication apparatus so that the communication apparatus limits the wireless power transfer.

19. A non-transitory computer-readable storage medium that stores a computer program for causing a computer included in a communication apparatus, which wirelessly receives power from another communication apparatus, to:

perform communication with said another communication apparatus to perform authentication for wireless power transfer; and in a case where the authentication for wireless power transfer via the communication succeeds, control the communication apparatus so that the communication apparatus wirelessly receives power based on power requested by the communication apparatus, from said another communication apparatus, and in a case where the authentication via the communication does not succeed, control the communication apparatus so that the communication apparatus limits the wireless power reception.

* * * * *